C. STARZMAN.
NUT LOCK.
APPLICATION FILED FEB. 13, 1909.
933,595.
Patented Sept. 7, 1909.
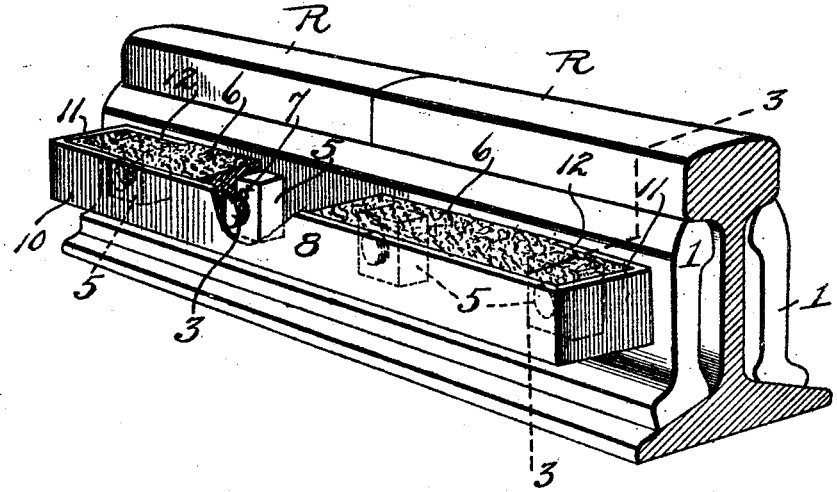
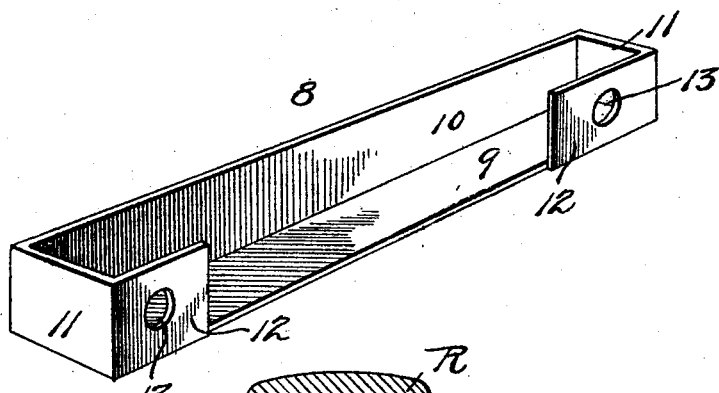
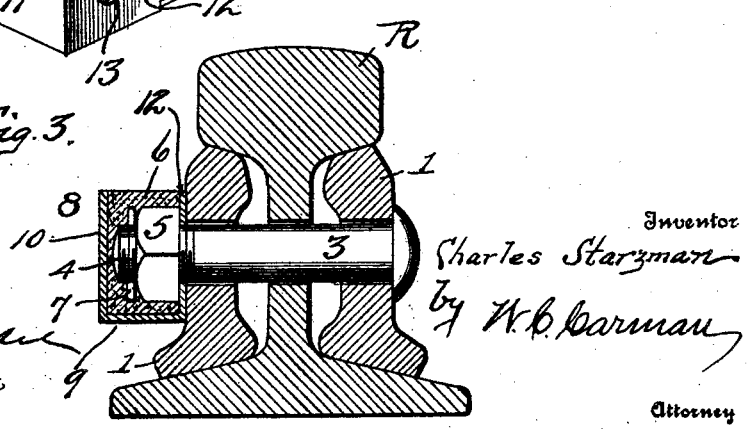
Inventor
Charles Starzman
by W. C. Barman
Attorney
Witnesses

UNITED STATES PATENT OFFICE.

CHARLES STARZMAN, OF PITTSBURG, PENNSYLVANIA.

NUT-LOCK.

933,595.  Specification of Letters Patent.  Patented Sept. 7, 1909.

Application filed February 13, 1909. Serial No. 477,730.

*To all whom it may concern:*

Be it known that I, CHARLES STARZMAN, a citizen of the United States, residing at Pittsburg, in the county of Allegheny and State of Pennsylvania, have invented certain new and useful Improvements in Nut-Locks, of which the following is a specification.

This invention relates to an improvement in the means for locking nuts upon bolts and also to prevent the latter from turning within their nuts after the latter have been tightened upon the object with which the bolts are associated.

To this end the invention contemplates a simple and practical nut and bolt lock. Also the invention has in view a form of construction which obviates the necessity of employing specially constructed locking devices having mechanical engagement with the nut and also with the bolt, while at the same time effecting a positive and rigid fastening of both the nut and the bolt, thus securing all of the necessary functions of a thoroughly practical nut and bolt lock without resorting to the expedients commonly employed for that purpose.

In carrying forward the objects above indicated, the present invention proposes to utilize a body of concrete or equivalent material as the fastening means for securing both the nut and the bolt, and in this connection possessing special utility in its application as a nut and bolt fastening means for rail joints. However, it is the purpose of the invention to extend the use thereof to nuts and bolts employed in connection with any article, device or machine where it is desired to securely lock the nut and bolt against turning after having once been tightened.

With these and other objects in view, which will readily appear to those familiar with the art as the nature of the invention is better understood, the same consists in the novel construction, combination and arrangement of parts hereinafter more fully described, illustrated and claimed.

In the suggested form of construction shown in the drawings, Figure 1 is a sectional perspective view showing the nuts and bolts of a rail joint locked through the medium of the improved locking means forming the subject of this application. Fig. 2 is a detail in perspective of a form of mold box that may utilized in connection with the rail joint for molding the concrete material onto and about the nuts and the ends of the bolts projecting through the latter. Fig. 3 is a vertical cross-sectional view on the line 3—3 of Fig. 1.

Like references designate corresponding parts in the several figures of the drawings.

As above indicated, the invention is capable of general application. It may be employed in connection with single nuts and bolts or with a plurality of nuts and bolts according to the position and location thereof, and also irrespective of the particular article, device or machine with which the nuts and bolts may be associated. However, the essential features of the invention, and the broad principles involved therein, are well exemplified by the application of the invention to the nuts and bolts of rail joints, such as shown in Figs. 1 and 3 of the drawings. Referring particularly to this embodiment of the invention, the rail joint shown in Fig. 1 includes in its organization the service rails R, the oppositely arranged splice bars or fish plates 1, 1, disposed respectively at opposite sides of the rails within the fishing spaces thereof and coupled through the medium of the usual series of joint bolts 3, whose threaded ends 4 have mounted thereon the nuts 5. According to the present invention, the locking of the nuts 5 is effected by the use of a body of concrete or equivalent moldable fastening material 6, adapted to be molded directly onto and about the nuts, and which, when hardened or set, acts as a rigid and immovable lock therefor. It is also preferably proposed to utilize the fastening material 6 as a means to prevent an independent turning of the bolts 3, and this may be conveniently accomplished by providing the projecting ends of the bolts beyond the outer sides of the nuts 5 with apertures or openings to receive auxiliary lock pins or keys 7, which like the nuts 5 are designed to be held within the body of the material which is molded thereabout. Of course any equivalent projections or depressions in or on the projecting ends of the bolts would serve the same purpose as the pins 7.

Any practical expedients may be resorted to for permitting the molding of the material 6 in a practical manner. For instance, as shown in the drawings, there may be employed an open top mold box 8 made of sheet metal or other suitable material. The mold box 8 in the form shown is of a generally rectangular design, the same being provided with a closed bottom 9, an outer front wall 10, the end walls 11, and the inner inturned holding ears 12, provided at the inner ends of said walls 11, said holding ears having the bolt holes 13 for the reception of the terminal or end bolts of the rail joint. With this construction of mold box the same is tightly held in position by the nuts of the said terminal or end bolts of the rail joint, which bolts and nuts therefore constitute a fixed point of support for the box, and the inner open side of the box between said ears 12 admits of the remaining nuts and bolt ends of the joint to lie wholly within the plane of the mold box.

In the construction described the concrete material in a plastic state is filled into the mold box about the nuts and projecting bolt ends having the pins 7, and when hardened or set performs the nut and bolt locking functions herein referred to.

The mold box may be a temporary or a permanent part of the locking means and would also necessarily be of different types according to the particular use of the invention, and at this point it may also be noted that according to the purpose of the invention the fastening material 6 may consist of any concrete, cement or equivalent material capable of being reduced to a plastic condition and then handled in the way contemplated by the present invention, and afterward becoming set or hardened in such a manner as to provide a practical nut and bolt lock.

What I claim is:—

1. In a lock of the class described, the combination with the bolt, the nut, and an auxiliary lock element carried by the bolt, of a separate mold box having a fixed point of support, and a body of concrete fastening material filled into the mold box about the nut and said auxiliary lock element.

2. In a lock of the class described, the combination with a plurality of bolts with their nuts, of a mold box supported from the bolts, and a body of concrete fastening material filled into the mold box about the nuts.

3. In a lock of the class described, the combination with a plurality of bolts with their nuts, of an open-top mold box receiving therein the several nuts and the ends of the bolts projecting through the latter, said mold box having terminal holding ears fastened in position by the terminal bolts of the series and their nuts, and a body of concrete fastening material filled into said mold box about the nuts and the bolts therein.

In testimony whereof I hereunto affix my signature in the presence of two witnesses.

CHAS. STARZMAN.

Witnesses:
S. D. CLARK,
EUGENE LIEBMAN.